US010305850B1

(12) United States Patent
Aziz (10) Patent No.: US 10,305,850 B1
(45) Date of Patent: May 28, 2019

(54) ENHANCED INSTANT MESSAGING SOCIAL NETWORK SYSTEM

(71) Applicant: Majid Aziz, Islamabad (PK)

(72) Inventor: Majid Aziz, Islamabad (PK)

(*) Notice: Subject to any disclaimer, the term of this patent is extended or adjusted under 35 U.S.C. 154(b) by 226 days.

(21) Appl. No.: 15/351,614

(22) Filed: Nov. 15, 2016

(51) Int. Cl.

| | |
|---|---|
| *G06F 15/16* | (2006.01) |
| *H04L 12/58* | (2006.01) |
| *H04L 29/08* | (2006.01) |
| *G06Q 30/02* | (2012.01) |
| *G06Q 50/00* | (2012.01) |
| *H04L 29/06* | (2006.01) |
| *G06F 3/0484* | (2013.01) |
| *G06F 3/0482* | (2013.01) |

(52) U.S. Cl.
CPC ......... *H04L 51/32* (2013.01); *G06Q 30/0261* (2013.01); *G06Q 30/0269* (2013.01); *G06Q 50/01* (2013.01); *H04L 51/04* (2013.01); *H04L 51/16* (2013.01); *H04L 51/20* (2013.01); *H04L 51/24* (2013.01); *H04L 63/20* (2013.01); *H04L 67/306* (2013.01); *G06F 3/0482* (2013.01); *G06F 3/04847* (2013.01)

(58) Field of Classification Search
CPC ......... G06Q 50/01; H04L 67/18; H04L 51/20; H04L 67/24; H04W 4/02; H04W 4/021
See application file for complete search history.

(56) References Cited

U.S. PATENT DOCUMENTS

| | | | | |
|---|---|---|---|---|
| 7,627,828 | B1* | 12/2009 | Collison | H04L 51/04 709/204 |
| 8,026,918 | B1* | 9/2011 | Murphy | G06N 3/006 345/473 |
| 8,213,969 | B2 | 7/2012 | Paik | |
| 8,370,895 | B2 | 2/2013 | DiCrescenzo | |
| 8,893,010 | B1* | 11/2014 | Brin | H04L 29/06476 715/738 |
| 9,514,331 | B2* | 12/2016 | Kanter | G06F 21/6245 |
| 9,749,842 | B2* | 8/2017 | Buzescu | H04W 8/22 |
| 9,961,535 | B2* | 5/2018 | Bucchieri | H04W 4/02 |
| 10,102,225 | B2* | 10/2018 | Madjar | G06F 17/30268 |
| 2007/0208992 | A1* | 9/2007 | Koren | G06Q 10/10 715/212 |
| 2008/0031203 | A1* | 2/2008 | Bill | H04L 51/04 370/338 |
| 2008/0040437 | A1 | 2/2008 | Agarwal | |
| 2008/0256189 | A1* | 10/2008 | Lyle | H04L 51/04 709/206 |
| 2009/0187623 | A1* | 7/2009 | Narayanaswami | G06Q 10/107 709/204 |
| 2010/0027527 | A1* | 2/2010 | Higgins | H04W 4/18 370/351 |
| 2010/0057875 | A1* | 3/2010 | Bychkov | G06Q 50/24 709/206 |
| 2010/0216491 | A1* | 8/2010 | Winkler | G06Q 10/10 455/457 |

(Continued)

*Primary Examiner* — Shean Tokuta
(74) *Attorney, Agent, or Firm* — Law Office of Sam Sokhansanj PLLC (57) ABSTRACT

An enhanced instant messaging social network (IMSN) system, method, and application that allows its users to chat with one another while providing enhanced location-based features, enhanced privacy controls, custom notification, secure backups, augmented reality features, and integrated marketing features, among other advantages.

19 Claims, 10 Drawing Sheets

(56) References Cited

U.S. PATENT DOCUMENTS

| | | | |
|---|---|---|---|
| 2011/0137997 A1* | 6/2011 | Stewart | G06Q 50/01 709/205 |
| 2012/0165035 A1 | 6/2012 | Chen | |
| 2012/0254804 A1* | 10/2012 | Sheha | G06Q 30/02 715/834 |
| 2013/0205400 A1* | 8/2013 | Yerli | H04L 63/0407 726/26 |
| 2013/0218967 A1* | 8/2013 | Chau | G06Q 50/01 709/204 |
| 2013/0340089 A1* | 12/2013 | Steinberg | H04L 63/10 726/27 |
| 2014/0108383 A1* | 4/2014 | Chan | G06Q 50/01 707/722 |
| 2014/0280526 A1* | 9/2014 | Filho | H04W 4/21 709/204 |
| 2014/0372540 A1* | 12/2014 | Libin | H04L 12/1822 709/206 |
| 2015/0099482 A1* | 4/2015 | Schmitz | H04L 51/043 455/404.2 |
| 2015/0172254 A1* | 6/2015 | Edouard | H04L 63/0421 726/26 |
| 2015/0195220 A1* | 7/2015 | Hawker | H04L 51/02 709/206 |
| 2015/0245168 A1* | 8/2015 | Martin | H04W 4/02 715/751 |
| 2015/0278546 A1* | 10/2015 | Uekubo | G06Q 10/10 726/28 |
| 2015/0309316 A1* | 10/2015 | Osterhout | G06F 3/012 345/8 |
| 2016/0150009 A1* | 5/2016 | LeRoy | H04L 67/1095 709/206 |
| 2017/0013322 A1* | 1/2017 | Thompson | H04N 21/6587 |
| 2017/0063876 A1* | 3/2017 | Hsun | H04W 76/10 |
| 2017/0068448 A1* | 3/2017 | Ghassabian | G06F 3/04886 |
| 2017/0103679 A1* | 4/2017 | Campbell | G10L 15/22 |
| 2017/0257454 A1* | 9/2017 | Hughes | H04W 4/21 |
| 2017/0272393 A1* | 9/2017 | Nimushakavi | H04L 65/403 |
| 2018/0005188 A1* | 1/2018 | Baldwin | H04L 67/306 |
| 2018/0095606 A1* | 4/2018 | Chae | H04L 51/32 |
| 2018/0129960 A1* | 5/2018 | Caballero | G06N 7/005 |

* cited by examiner

ENHANCED INSTANT MESSAGING SOCIAL NETWORK SYSTEM

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Instant messaging applications have provided the ability for communication between two or more users quickly between electronic devices. The use of instant messaging applications on mobile wireless devices has enabled users to connect and stay connected with groups of people via text, audio and video based messages no matter where they are. The inclusion of location identification capabilities in wireless mobile devices, such as Global Positioning System (GPS), have further enabled information to be delivered to the devices based upon their location. Wireless mobile devices can determine their location with considerable accuracy but have primarily been limited to mapping and navigation applications. The advent of instant messaging and social networking applications have created an increased desire to be aware of the activities and locations of friends, family, groups, and various contacts. Further, user privacy has been recognized as a problem in practical social networks, namely, balancing a users' desire of sharing their data with the users' needs to keep data private against future undesired consequences.

Hence, what is needed is an instant messaging social network system, method, and application that allows its users to chat with one another while providing enhanced location-based features, enhanced privacy controls, secure backups, augmented reality features, marketing features.

BRIEF SUMMARY

In one aspect of the disclosure described herein, an enhanced instant messaging social network (IMSN) system, method, and application is disclosed that allows its users to chat with one another while providing enhanced location-based features, enhanced privacy controls, custom notification, secure backups, augmented reality features, and integrated marketing features, among other advantages.

In another aspect of the disclosure described herein, a method of managing an instant messaging social network on a mobile device is disclosed. Here, the method can include receiving a request from a first user to unlock access to a portal, displaying a contact list at the portal, wherein the contact list is comprised of at least a second user and a third user, displaying one or more geographic locations of the second user and the third user on a geographical map, receiving a request from the first user to initiate a chat session with the second user or the third user from either the contact list or the geographical map, receiving a request from the first user to define one or more privacy settings, wherein the privacy settings can include defining a first image and a second image to be displayed as one or more profile images to the second user and the third user, wherein the first image is only viewable to the second user and the third image is only viewable to the third user, and defining a first location and a second geographical location to be displayed as a current location of the first user to the second user and the third user, wherein the first location is only viewable to the second user and the second location is only viewable to the third user.

The method can further include receiving a request to define one or more notification settings, wherein the notification settings can include exceptions, wherein the exceptions define which notification to receive or to not receive from the second user or the third user. The method can also include receiving a request from to save or back-up the chat session. In addition, the method can include receiving a request from to restore the chat session. Further, the method can include receiving a request from to initiate a virtual reality or augmented reality session. In addition, the method can include receiving one or more advertising or promotional information and delivery criteria to the first, second, or third users. Here, the delivery criteria can include transmitting the promotional or advertising information depending on the geographical location of the first, second, or third users. Also, the method can include displaying one or more points of interest on the geographical map and a plurality of information associated with the one or more points of interest.

In another aspect of the disclosure described herein, an instant messaging social network system is disclosed. Here, the system can include an authentication module for authenticating one or more users, wherein the authentication module can be comprised of a lock screen. The system can also include a contact list module for displaying a plurality of users within the instant messaging social network, a geographic location module for displaying the locations of the plurality of users of the instant messaging social network on a geographical map. In addition, the system can include a privacy module for defining one or more privacy settings for the plurality of users of the instant messaging social network, wherein the privacy module can further include a profile image module for defining a first image and a second image to be displayed as one or more profile images to the plurality of users, wherein the first image is only viewable by one user and the second image is only viewable by another user. In addition, the system can include a profile location module for defining a first location and a second geographical location to be displayed as a current location to the plurality of users, wherein the first location is only viewable to the one user and the second location is only viewable to the other user.

The system can further include a notification module for defining one or more notification settings. Here, the notification settings can include exceptions, wherein the exceptions define which notification to receive or to not receive from the second user or the third user. Further, the system can include a storage module for saving or backing-up the chat session. In addition, the system can include a restore module for restoring the chat session. The system can also include a virtual reality or augmented reality module for initiating a virtual reality or augmented reality session between the plurality of users. Here, the system can also include a marketing module for receiving one or more marketing or promotional information and delivery criteria to the first, second, or third users. Further, the delivery criteria of the marketing module can be comprised of transmitting the marketing or advertising information depending on the geographical location of the first, second, or third users. The system can also include a points of interest module for displaying one or more points of interest on the geographical map and a plurality of information associated with the one or more points of interest.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Any discussion of a server, terminal, computing, or mobile device may also apply to any type of networked device, including but not limited to phones such as cellular phones (e.g., an iPhone®, Android®, Blackberry®, or any 'smart phone'), a personal computer, desktop computer, iPad®, server computer, laptop computer, personal digital assistants (PDAs), handheld device, wrist watch, headset, wearable device, a roaming device such as a network-connected roaming device, a wireless device such as a wireless email device or other device capable of communicating wireless with a computer network, or any other type of network device that may communicate over a network and handle electronic transactions or information. Any discussion of any mobile device mentioned may also apply to other devices for operating, processing, using, or executing the content filtering method and system of the disclosure described herein.

Phrases and terms similar to "software", "application", and "firmware" may include any non-transitory computer readable medium storing thereon a program, which when executed by a computer, causes the computer to perform a method, process, or function.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" may include an intranet page, internet page, locally residing software or application, or digital presentation for a user of the present disclosure described herein. The portal may also be any graphical user interface for accessing various modules, features, options, and/or attributes of the present disclosure described herein. For example, the portal can be a web page accessed with a web browser, mobile device application, or any application or software residing on a computing device.

Figure 1:
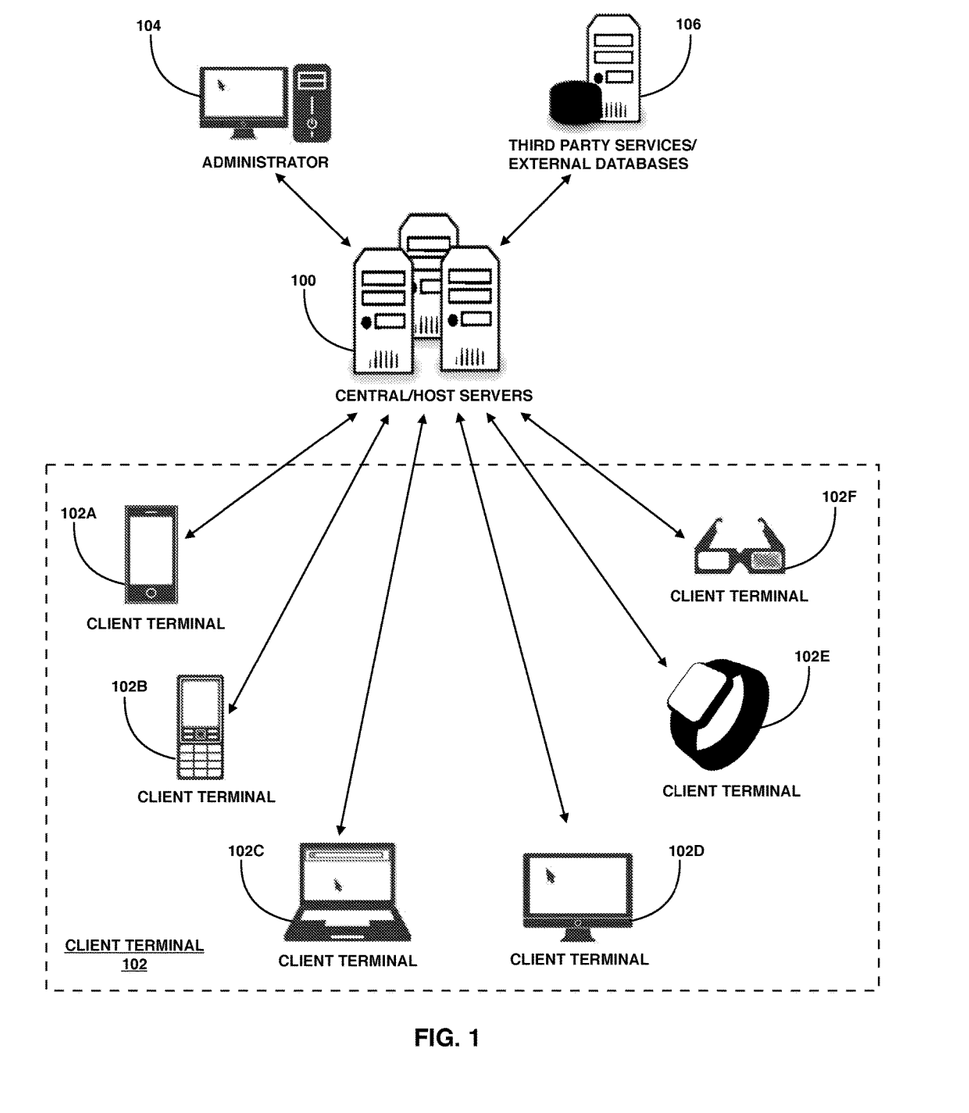
FIG. 1 illustrates an overview network architecture diagram for one non-limiting embodiment of a general network and system architecture for the IMSN of the disclosure described herein.

FIG. 1 illustrates a general network and system architecture diagram for one non-limiting embodiment of the instant messaging social network (IMSN) of the disclosure described herein. Here, the IMSN can include one or more central host servers 100 in bi-directional communication with a plurality of client terminals 102, administrator 104, and external databases 106. More specifically, client terminals 102 can be any type of computing devices 102A-102F communicating in real-time with any one or more of devices 102A-102F through central servers 100 of the IMSN, or via cellular network. Further, administrator 104 may have any type of access privileges to the IMSN. In addition, central servers 100 of the IMSN may receive and transmit information with one or more third party systems 106 or be integrated with existing third party networks. For example, servers 100 and terminals 102 may receive and transmit real-time updates, feeds, and information, such as updated maps information, news information, user information, or software updates, among others. For example, third party systems 106 may be Google®, Facebook®, or WhatsApp®, among other networks, systems, or databases.

Figure 2:
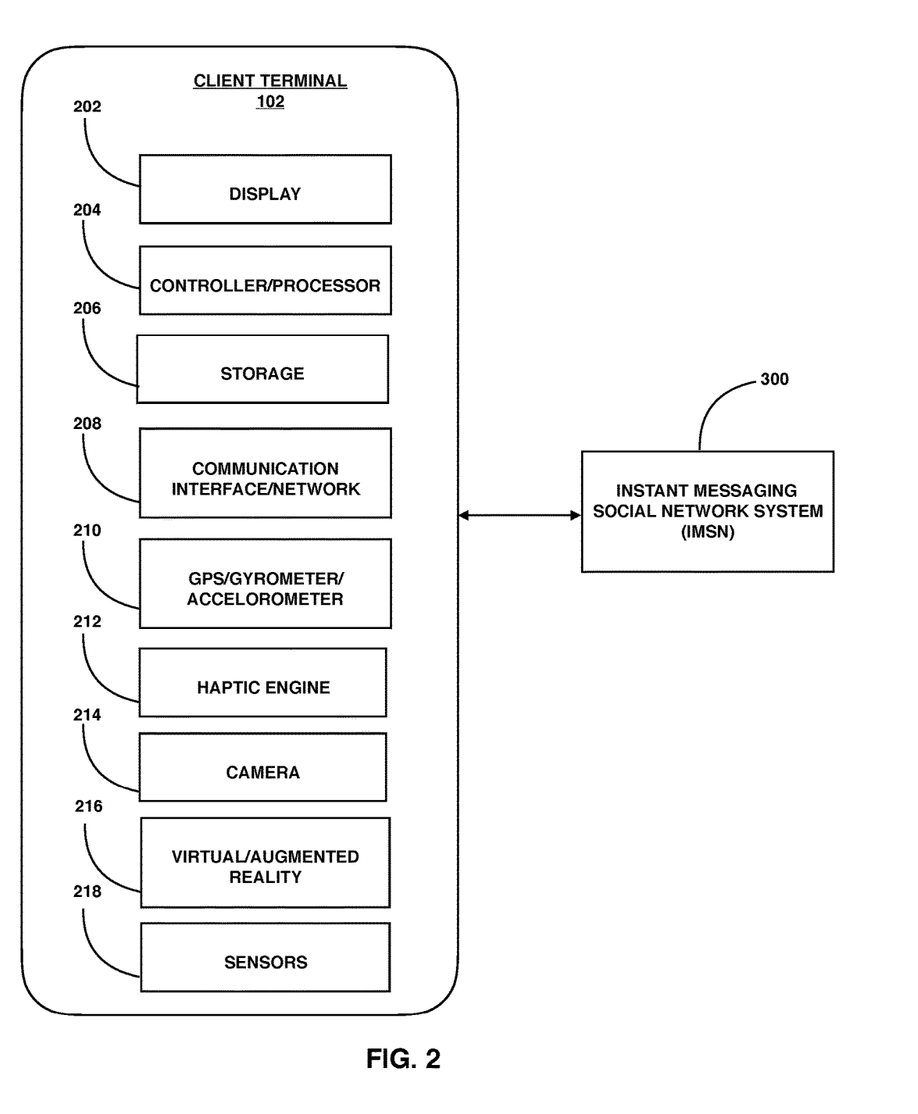
FIG. 2 illustrates an overview block diagram for one non-limiting embodiment of a client terminal in communication with the IMSN of the disclosure described herein.

FIG. 2 illustrates an overview block diagram for one non-limiting embodiment of a client terminal in communication with the IMSN of the disclosure described herein. In particular, client terminal 102 can include several hardware or software devices, components, systems, or modules. For example, terminal 102 may include a display or visual output module 202, controller/processors 204, storage module 206, communication/network interface 208, GPS/gyrometer/accelerometer 210, haptic feedback engine 212, camera or multimedia/video/audio capturing device 214, a virtual reality (VR) or augmented reality (AR) system 216, and sensors 218, such as bio/health or environmental sensors. Further, the IMSN 300 of the disclosure described herein may reside locally on client terminal 102 or remotely. In addition, IMNSN 300 may access, configure, and control any one or more of components 202-218 of client terminal 200. For example, IMSN 300 may include functionality within any one or more of its user interface portals to access components 202-218, such as AR/VR 216, camera 214, sensors 218, and haptic engine 212 to provide a more enhanced user experience during an instant messaging or communication session with one or more users.

Figure 3:
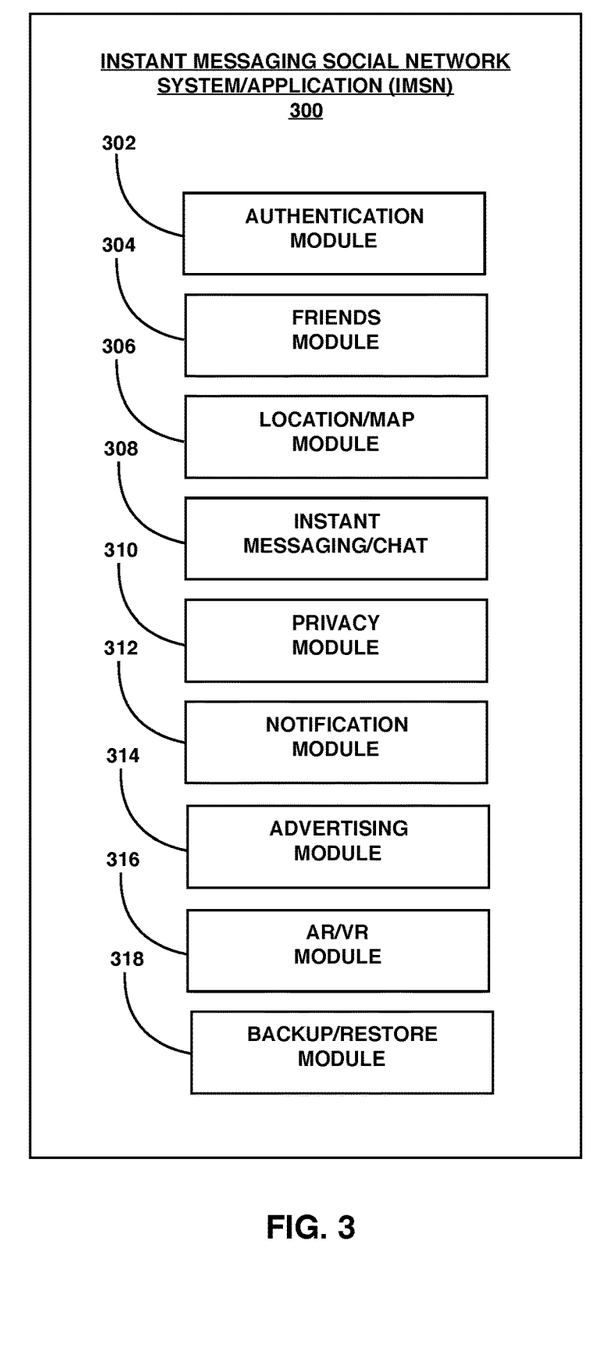
FIG. 3 illustrates a block diagram for one non-limiting embodiment of a plurality of modules for the IMNSN of the disclosure described herein.

FIG. 3 illustrates a block diagram for one non-limiting embodiment of a plurality of modules for the IMNSN of the disclosure described herein. Here, IMSN 300 may include an authentication module 302, friends or contact list module 304, location and map module 306, instant messaging and chat module 308, privacy module 310, notification module 312, advertising/marketing module 314, AR/VR module 316, and backup and restore module 318. However, it is contemplated within the scope of the disclosure described herein that IMSN 300 may also include any other type of module, either residing locally within IMSN 300 application accessible remotely via a network.

Still referring to FIG. 3, authentication module 302 can include any type of user authentication or verification protocol for accessing, using, or controlling the IMSN application. For example, such authentication may include passcode, password, biometric scanning or recognition, voice recognition, iris scanning, or behavior/pattern recognition. In addition, the IMSN application may include any type of encryption, such as Advanced Encryption Standard (AES) with either 128 bit or 256 bit key sizes, Secure Hash Algorithm (SHA) algorithms, RSA encryption, Public/Private Keys, Digital Signatures, Elliptic Curve Digital Signature Algorithm (ECDSA), Elliptic Curve Diffe-Hellman Algorithm (ECDH), or any other type of data encryption, decryption, ciphering, decryption, and deciphering algorithms standard or protocol as defined or adopted by the National Institute of Standards and Technology (NIST). Further, the authentication module may be used from within the IMSN application, such as during any communication session or at any user interface portal.

Still referring to FIG. 3, friends module 304 may include a list of contacts, friends, users, associates, or groups of friends or contacts. In addition, module 304 may include contact, biography, photos, images, video, audio, preferences, tracking, location, their friends/contacts, pattern/behavior, or biometric information for each friend. Here, the IMSN application may be configured such that any one or more users of the IMSN may have pre-defined access privileges to such information, or as defined by each user, friend, or contact per the IMSN's privacy controls. The location module 306 can include the capability for the IMSN to provide a map, notification, or suggestion to any user of the IMSN of another user's, friend, contact, or group of friends location or proximity. Here, such functionality may be integrated and work in unison or simultaneously during a chatting session with the other user friend or contact. For example, the IMSN may notify a user that they are in proximity to another user of the IMSN and if they want to initiate a communication session. In addition, location module 306 can further provide a map, notification, or suggestion to any of its users of certain places, points of interest, or promotional offers in proximity to the user. For example, such places may include banks, ATMs, restaurants, coffee shops, hospitals, parks, retail shopping stores, and the like. For example, during a chatting session, if a user is in near proximity to such places then the IMSN may send an automatic notification to the user, such as a promotional offer in that area of the user. It is contemplated within the scope of the disclosure that the location module may also be configurable, such as showing users, friends, or places that are either within one feet of each other up to and including within 5000 miles from each other.

Still referring to FIG. 3, instant messaging and chat module 308 may be any type of communication protocol, such as through web-based chat applets, locally residing chat protocol, internet relay chat (IRC), or SMS text messaging through cellular networks, among others. For example, the IMSN application may include or be integrated to function with existing communication protocols, such as Bitmessage, Gadu-Gadu, IRC, MSNP, Apple iMessages, Skype, XMPP/Jingle, Signal Protocol, Matrix, MtProto, Mumble, OSCAR, RVP, Ricochet, Ring, SIP/SIMPLE, Steam Friends, TOC2, TOX, any DHT based protocol, Windows Messenger Services, YMSG, or Zephyr Notification Service, among others. In addition, chat module 308 may be integrated within any one or more of modules 302-318. For example, chat module 308 may be initiated from friends module 304 or location module 306.

Still referring to FIG. 3, privacy module 310 can include any type of privacy control for any of the users of the IMSN application. Here, user's of the IMSN can have the ability to control their location, images, information, data, preferences, or any other type of user data. Specifically, a user may designate that only a pre-defined set of friends or contacts may view the user's profile information, such as photos or preferences. Alternatively, a user may be able to have any one or more photos to be shown to just one friend, or group of friends. For example, the user may designate one profile photo to be shown to a certain friend and another different profile photo to be shown to another friend. Further, such customization may also be extended to location preferences. For example, a user may want to show their real-time location to one friend, but a different alternative location (or no location at all) to another friend or group of friends. However, it is contemplated within the scope of the disclosure described herein that any other privacy control settings may be configured depending on the user's desire for privacy.

Still referring to FIG. 3, advertising module 314 can allow any user to advertise or promote various goods or services through the IMSN application. For example, an advertiser may want to promote certain goods to users that are within a pre-defined proximity to the advertiser's store location. In addition, the advertiser may send notifications to the user of the IMSN that are not only in proximity to the store but also having a conversation or communication session that is related to either the store or the goods or services the advertiser is selling. As such, the advertising module 314 allows both user's and advertisers to send or receive promotional information in real-time through the IMSN. Further, users may also configure and control the advertising module, such as setting preferences for what promotions (if any) they want to receive via privacy (or preference) control settings within the IMSN application. More specifically, the advertising module can have one dashboard portal for the advertiser and another dashboard portal for the user.

Still referring to FIG. 3, AR/VR module 316 can provide users of the IMSN application to communicate with each other through a more engaged platform. For example, during an instant messaging communication session, a user may want to initiate an AR or VR form of communication with another user. Here, the AR/VR module can allow the user to use their mobile devices (or alternative AR/VR hardware) to initiate the communication session. For example, the AR/VR communication session can be performed through the IMSN application, such as an IMSN application residing on a mobile device phone that is connected to an AR or VR headset, such as a Samsung® Note phone secured to a Samsung® Gear VR headset. Alternatively, the IMSN application may reside on a standalone computing device communicating remotely or wirelessly with an AR or VR headset, such as an Oculus® Rift. Alternatively, the IMSN application reside locally on an AR or VR headset or wearable device.

Still referring to FIG. 3, backup and restore module 318 allows users the ability to save, backup, load, and restore current or past communication or chat sessions. For example, a user may backup one or more chat sessions or conversations with another user. Alternatively, the IMSN application may automatically backup a user's chat sessions to one or more databases, either in real-time or at predetermined intervals. In addition, users can have the ability to view and restore prior backups of chat sessions. In other embodiments, the backup module may automatically send a backup copy of an entire chat session via email to one or more users. In addition, the back and restore module 318 can allow a user to define a timeline, date/time period or range, or specific date/time of one or more previously chats to be backed up into one or more databases. For example, a user can define a date range for all chats (or chats pertaining to selected friends/contacts) to be backed up. Similarly, the user can also have the ability to restore previously backed up chat sessions based on a timeline, date/time period or range, or specific date/time from the one or more databases.

Figure 4:
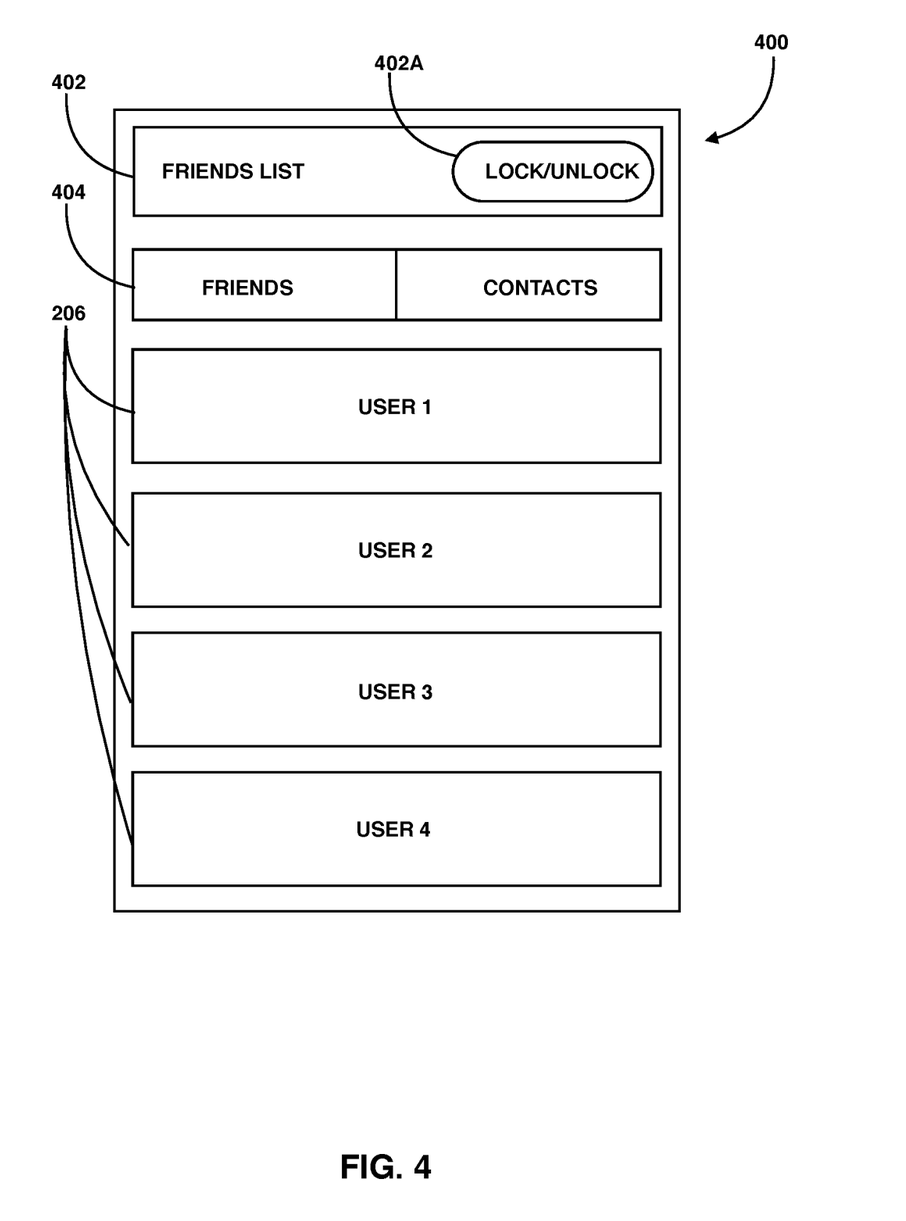
FIG. 4 illustrates a user interface portal for one non-limiting embodiment of a friends or contact list for the IMSN of the disclosure described herein.

FIG. 4 illustrates a user interface portal for one non-limiting embodiment of a friends or contact list for the IMSN of the disclosure described herein. Here, portal 400 can have a heading 402 indicating if a user is viewing a friends list, contact list, group list, or the like. In addition, at portal 400, the user has the ability to lock or unlock 402A the IMSN application. Here, this lock and unlock 402A selection capability is independent of the mobile devices operating system lock and unlock capability. As such, the additional lock and unlock 402A capability of the IMSN application provides an additional added security. Here, the lock and unlock 402A capability can work in conjunction with the authentication module 302. Since the lock and unlock feature works independently of a device's operating system or third party software, while the lock mode selection is initiated, the IMSN application continues to have work and have processes running in the background, such as when new notifications/messages are received or continuing to receive messages within one or more active or prior chat sessions. In particular, there may be many processes, such as parent processes and child processes each having a unique PID while the IMSN application is in lock mode. As such, when the user unlocks the IMSN application, the IMSN application will be available in its most current state, such as with the most recent notifications or messages. Alternatively, the user may be able to view a history of events that occurred while the IMSN application was in lock mode.

Still referring to FIG. 4, the user also has the option to select a friends list or contact list 404 for viewing. In addition portal 400, can include the list of each friend 206 that is part of the user's network or friends list. Here, the user listing 206 can include a visual profile picture, user information, status, current location, and the like. Once any of friends 206 are selected, the user of the IMSN application may initiate a communication or instant messaging session, as shown in FIG. 5.

Figure 5:
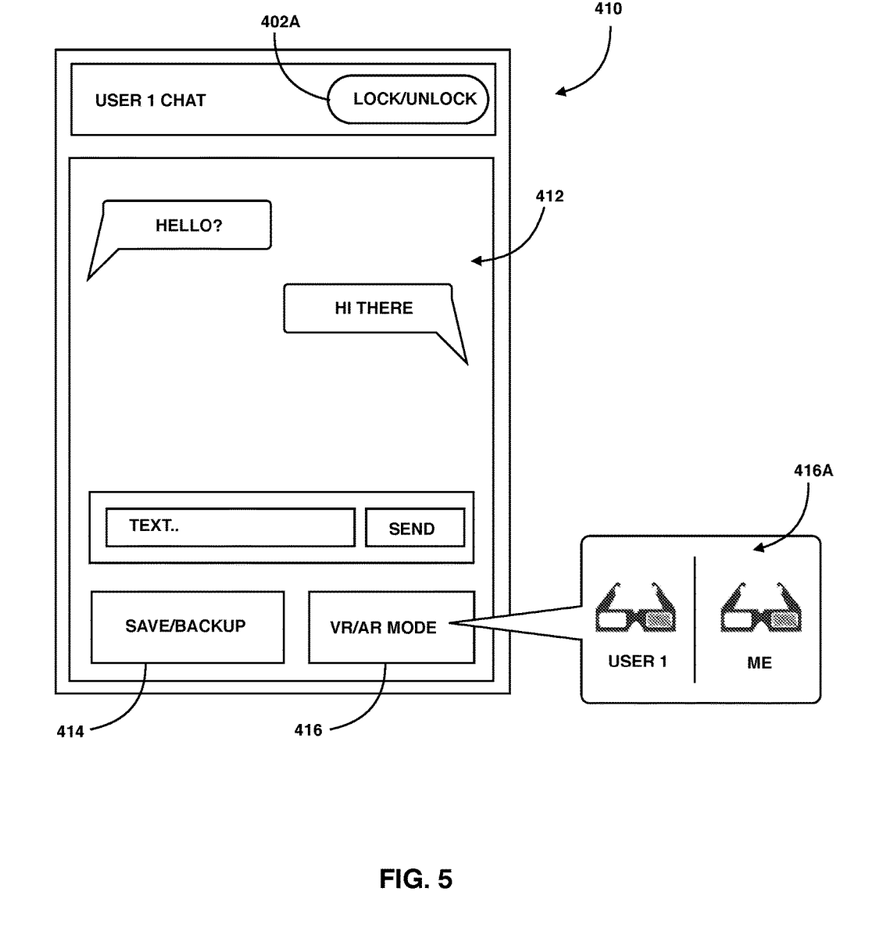
FIG. 5 illustrates a user interface portal for one non-limiting embodiment of a instant messaging or chatting window for the IMSN of the disclosure described herein.

FIG. 5 illustrates a user interface portal for one non-limiting embodiment of an instant messaging or chatting window for the IMSN of the disclosure described herein. Here, portal 410 also provides the user to lock or unlock 402A the portal chat window at any time, or lock/unlock the IMSN application altogether. Here, portal 410 can include a chat session area 412 displaying prior or active chats. In addition, the user may be able to save/backup or restore particular chat sessions via input icon 414, directly from the chat session portal 410. In addition the user can have the ability to initiate an AR or VR session with another user via an AR or VR mode input icon 416. For example, if an AR/VR mode is initiated, then portal 410 or window 412 can turn into an AR/VR display with moving graphics, either partially or entirely, in combination with text, images, video, and audio. As such, the portal may depict both users on the display screen, either in split screen mode or other variation. In other embodiments, two users may allow their real-time chat session to be made public or viewable to other users of the IMSN application, wherein other users may elect to enter the chat session.

Figure 6:
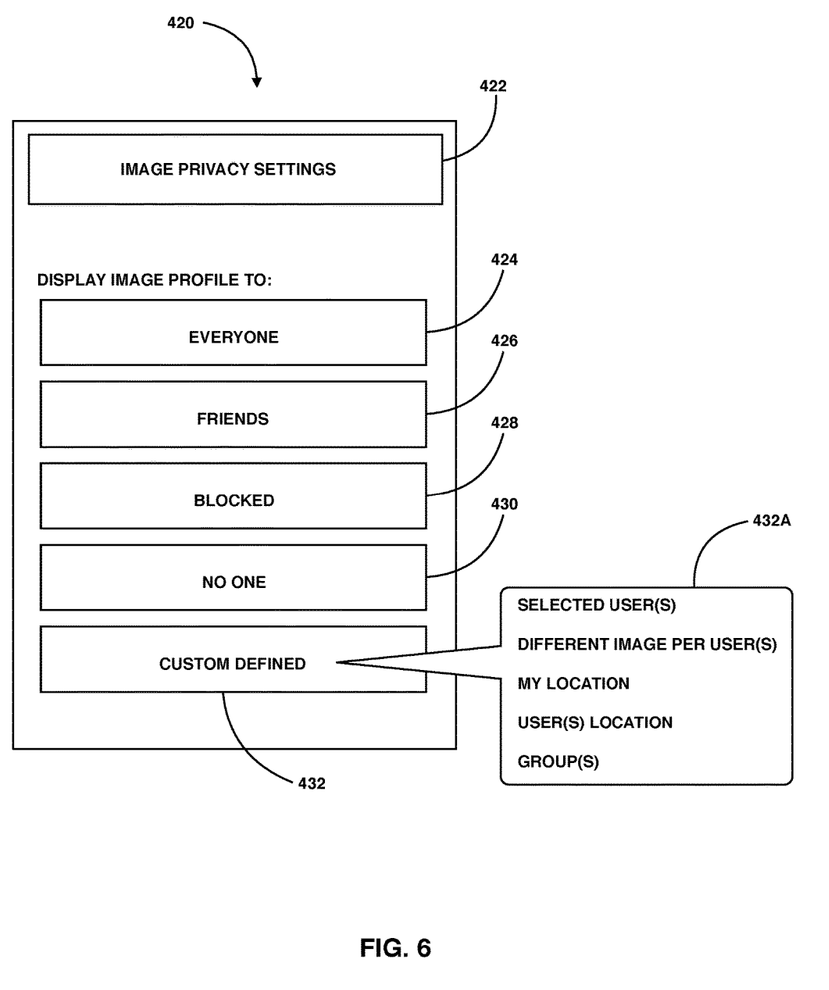
FIG. 6 illustrates a user interface portal for one non-limiting embodiment of a plurality of image privacy control features for the IMSN of the disclosure described herein.

FIG. 6 illustrates a user interface portal for one non-limiting embodiment of a plurality of image privacy control features for the IMSN of the disclosure described herein. Here, portal 420 provides a heading 422 indicating image privacy settings for a user wherein the user has the ability customize and select how his or her image or images will be displayed to others users or the public. Specifically, portal 420 can provide the user the option to have the IMSN display the user's images (such as profile pictures, or album pictures) to everyone (public) 424, friends or contacts 426, blocked friends contacts 428, to only the user or no one 430, or to a custom defined list 432 of friends or contacts. More specifically, if a custom defined list 432 is selected, then the user may be shown several options 432A. Among them, the user may select one or more other users who may view images, different image per different one or more users, one or more images based on the user's location or other users' locations, or one or more images displayed to certain groups of users. For example, a user may select to have a first profile picture shown to first user/friend, a second profile picture shown to a second user/friend, and a third profile picture to the public or other friends. More specifically, in the case of a custom defined list, if previous friends or contacts were viewing one profile picture then those friends or contacts will continue seeing the same profile picture, even though the user has defined a separate profile picture to be shown to a custom defined friend or contact. Further, the user may have additional control over the images shown, such as having a third picture shown to a third user/friend depending on the location of the user or the location of the third user/friend. This customization allows for a higher level privacy for the IMSN application. However, it is contemplated within the scope of the disclosure that any other type of data, in lieu of images may be configured the same way, such as video, audio, or preferences.

Figure 7:
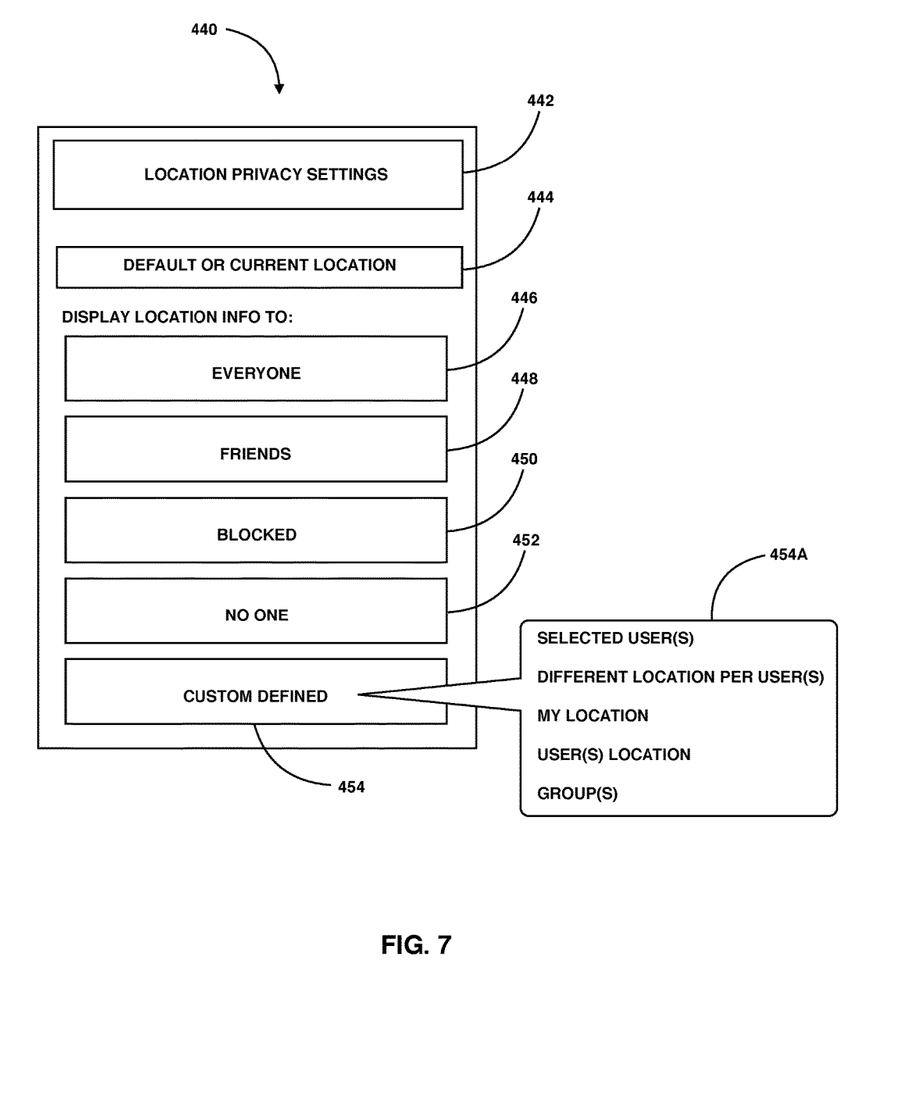
FIG. 7 illustrates a user interface portal for one non-limiting embodiment of a plurality of location privacy control features for the IMSN of the disclosure described herein.

FIG. 7 illustrates a user interface portal for one non-limiting embodiment of a plurality of location privacy control features for the IMSN of the disclosure described herein. Similar to portal 420, portal 440 allows a user to control location settings. Here, portal 440 includes a heading 442 indicating that the user can configure any type of privacy controls with regards to their location, via GPS tracking or other tracking technology. More specifically, the user may set his or her current location via icon 444 as their default location. Alternatively, the user may set a location that is not their current location as their default location. Here, the user has the ability allow their current or default location to be shown either to to everyone (public) 446, friends or contacts 448, blocked friends contacts 450, to only the user or no one 452, or to a custom defined list 454. More specifically, if a custom defined list 454 is selected, then the user may be shown several options 454A. Among them, the user may select one or more other users who may view the user's location, different location per different one or more users, one or more locations based on the user's location or other users' locations, or one or more images displayed to certain groups of users. For example, a user may select to have a first location shown to first user/friend, and a second location shown to a second user/friend and other users (or the public) to see another third location. More specifically, in the case of a custom defined locations, if previous friends or contacts were viewing one location of the user then those friends or contacts will continue seeing the same location, even though the user has defined a different location to be shown to a custom defined friend or contact. Further, the user may have additional control over the locations shown, such as having a third location shown to a third user/friend depending on the location of the user or the location of the third user/friend in proximity to each other.

Figure 8:
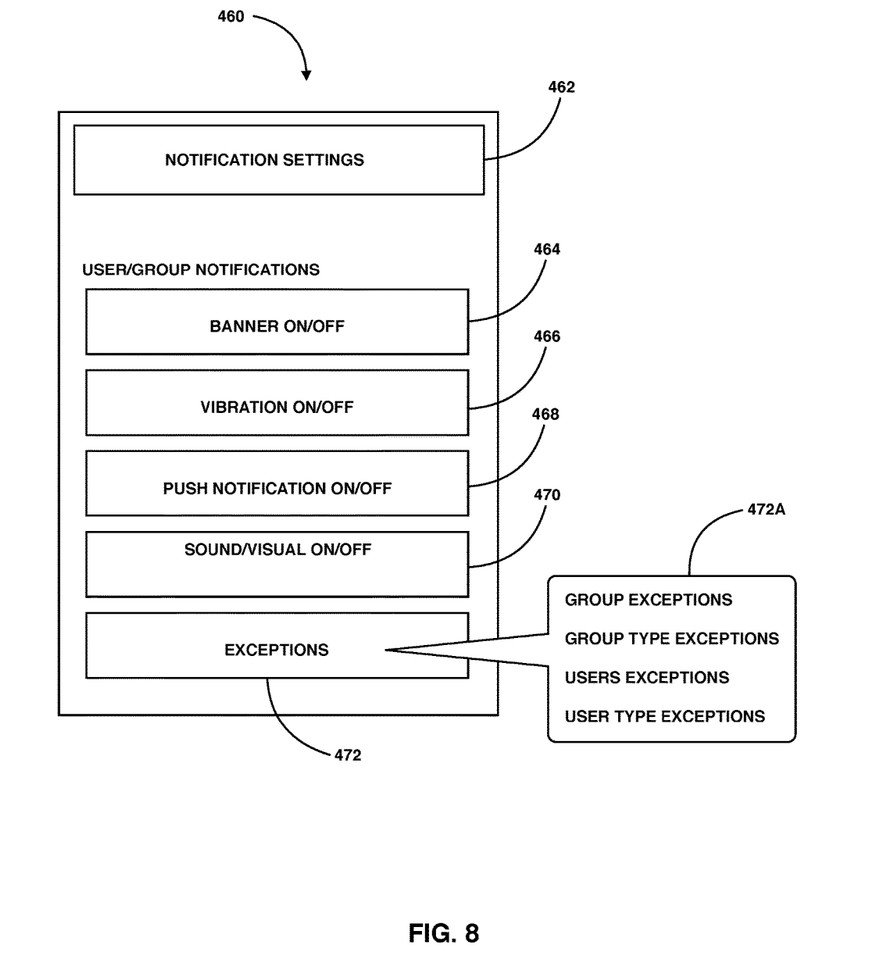
FIG. 8 illustrates a user interface portal for one non-limiting embodiment of a plurality of notification control features for the IMSN of the disclosure described herein.

FIG. 8 illustrates a user interface portal for one non-limiting embodiment of a plurality of notification control features for the IMSN of the disclosure described herein. Here, portal 460 is shown having a notification settings heading 462. In particular, the user has the ability to configure how he or she would like to receive notification through the IMSN application. These notifications can include a banner notification 464, vibration notification 466, push notifications 468, sound/audio/visual/multimedia notifications 470, and defining rules or exceptions 472 to any type of notification. More specifically, if exceptions 472 are selected, then the user can have the ability to define various exceptions 472A, such as receiving certain types of notifications depending a group exceptions, group type exceptions, users/friends/contacts exceptions, or certain user exceptions. For example, the user may want to receive a certain type of notification, such as audio and vibration, when receiving messages from another user through the IMSN application. Alternatively, the user may want to forego receiving any notification from certain users/friends within a group. It is contemplated within the scope of the disclosure described herein that any other type of rules, policy, or exceptions as to the notification settings. For example, the groups may include groups comprised of family members, relatives, close-friends, or the like. As such, a user may receive a particular notification that comes from a designated group, and not receive notifications from another particular group. Further, it is contemplated within the scope of the disclosure that the IMSN application has the ability to over-ride a third-party application's, (or the devices operating system's) global or local settings. For example if a third party app (or operating system) has notifications set on silent (or do not disturb) for its global or local settings, then the IMSN application will over-ride or bypass such global or local settings with its own notification settings and group exceptions, such as notifying the user if a family member within a group has sent them a message even though the overall global or local settings for a third party application or operating system are set differently.

Figure 9:
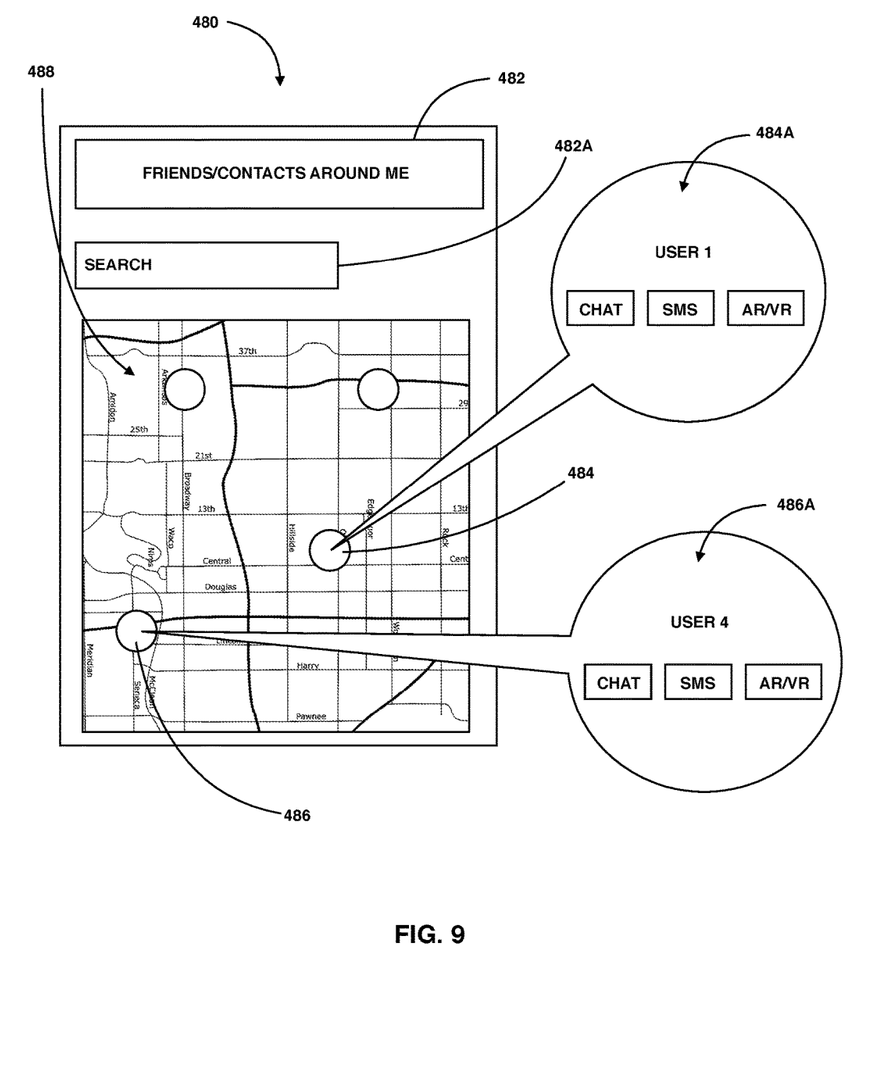
FIG. 9 illustrates a user interface portal for one non-limiting embodiment of a friend or contact list proximity map feature for the IMSN of the disclosure described herein.

FIG. 9 illustrates a user interface portal for one non-limiting embodiment of a friend or contact list proximity map feature for the IMSN of the disclosure described herein. Here, portal 480 is shown having a friends or contacts around me heading 482 and an active map 488. More specifically, map 488 allows the user to see the locations of certain users, friends, or contacts in real-time, via markers 484 and 486. In particular, if a user selects any of markers 484 or 486, then the user will be able to view expanded information and functionality with regards to the selected user, such as information 484A and 486A. For example, the user may be able to initiate a chat session directly from the selected marker or user from the map in real-time. In particular, the user may have the ability to chat with the selected user within the map portal 480 and without having to leave the map portal 480. In addition, the user may be able to search for certain users, friends, or contacts from within a search box 482A to view their location on either an expanded map or close-up view map. In addition, the map can also display the user's locations relative to his or her friends or contacts, including directions.

Figure 10:
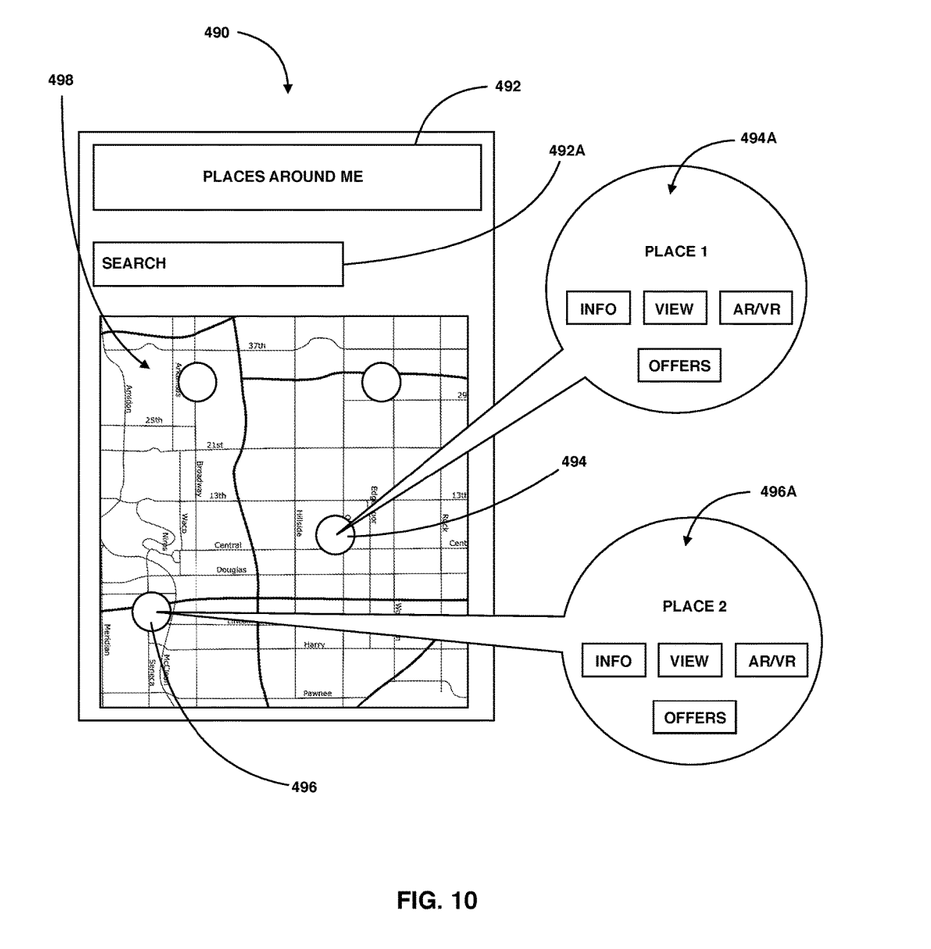
FIG. 10 illustrates a user interface portal for one non-limiting embodiment of a plurality of places proximity map feature for the IMSN of the disclosure described herein.

FIG. 10 illustrates a user interface portal for one non-limiting embodiment of a plurality of places proximity map feature for the IMSN of the disclosure described herein. Here, portal 490 is shown having a places around me heading 492 and an active map 498. More specifically, map 498 allows the user to see the locations of certain places, points of interest, or areas via markers 494 and 496. In particular, if a user selects any of markers 494 or 496, then the user will be able to view expanded information and functionality with regards to the selected place or point of interest, such as information 494A and 496A. For example, the user may be able to initiate a chat session with a representative of the location, call session, or an AR/VR session directly from the selected marker or place from the map in real-time. In particular, the user may have the ability to view or initiate such sessions with the selected place from within the map portal 490 and without having to leave the map portal 490. In addition, the user may be able to search for certain places or points of interest from within a search box 492A to view their location on either an expanded map or close-up view map. Alternatively, map 498 may also show certain places in proximity to the user that are offering promotions, offers, or discounts that may be of interest to the user. Likewise, advertisers may be able to view other users of the IMSN on the map in real-time to directly target certain users for promotions or offers on certain goods or services. In addition, the map can also display the user's locations relative to certain places and further include directions to such places.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the disclosure described herein is not limited to the specific forms or arrangement of parts or method of assembly described herein, except insofar as such limitations are included in the following claims. Further, it will be understood that certain features and sub-combinations are of utility and may be employed without reference to other features and sub-combinations.

What is claimed is:

1. A method of managing an instant messaging social network on a mobile device, the method comprised of:
   displaying a graphical element representing a locking or unlocking authentication module for a portal, and receiving one or more messages from one or more users while the portal is in a locked configuration;
   receiving a request from a first user to unlock access to the portal via the graphical element and displaying the received messages to the first user while the portal was in the locked configuration;
   displaying a contact list at the portal, wherein the contact list is comprised of at least a second user and a third user;
   displaying one or more geographic locations of the second user and the third user on a geographical map;
   receiving a request from the first user to initiate a chat session with the second user or the third user from either the contact list or the geographical map;
   receiving a request from the first user to define one or more privacy settings, wherein the privacy settings are comprised of:
   defining a first image and a second image to be displayed as one or more profile images to the second user and the third user, wherein the first image is viewable to the second user and the second image is viewable to the third user as a profile image of the first user, wherein the third user is unable to view the first image as the profile image and the second user is unable to view the second image as the profile image; and
   defining a first geographical location and a second geographical location to be displayed as a current location of the first user having the first image as the profile image to the second user and the second image as the profile image to the third user, wherein the first location is viewable to the second user and the second location is viewable to the third user.

2. The method claim 1, further comprising receiving a request to define one or more notification settings.

3. The method of claim 2, wherein the notification settings are comprised of exceptions, wherein the exceptions define which notification to receive or to not receive from the second user or the third user.

4. The method of claim 1, further comprising receiving a request to save or back-up the chat session.

5. The method of claim 4, further comprising receiving a request to restore the chat session.

6. The method of claim 1, further comprising receiving a request to initiate a virtual reality or augmented reality session.

7. The method of claim 1, further comprising receiving one or more advertising or promotional information and delivery criteria to the first, second, or third users.

8. The method of claim 7, wherein the delivery criteria is comprised of transmitting the promotional or advertising information depending on the geographical location of the first, second, or third users.

9. The method of claim 1, further comprising displaying one or more points of interest on the geographical map and a plurality of information associated with the one or more points of interest.

10. An instant messaging social network system, the system comprised of:
    an authentication module for authenticating one or more users for access to a portal, wherein the authentication module is comprised of a lock screen;
    a messaging module for receiving one or more messages from the one or more users while the authentication module of the portal is in a secured and unsecured configuration;
    a contact list module for displaying a plurality of users within the instant messaging social network;
    a geographic location module for displaying the locations of the plurality of users of the instant messaging social network on a geographical map;
    a privacy module for defining one or more privacy settings for the plurality of users of the instant messaging social network, wherein the privacy module is further comprised of:
    a profile image module for defining a first image to be displayed as a first profile image of a first user and defining a second image to be displayed as a second profile image of the first user, wherein the first profile image is viewable by a second user but not a third user, and the second profile image is viewable by the third user but not the second user; and
    a profile location module for defining a first geographical location of the first user to be displayed to the second user and a second geographical location of the first user to be displayed to the third user, wherein the first location is viewable to the second user but not the third user and the second location is viewable to third user but not the second user.

11. The system of claim 10, further comprising a notification module for defining one or more notification settings.

12. The system of claim 10, wherein the notification settings are comprised of exceptions, wherein the exceptions define which notification to receive or to not receive from the second user or the third user.

13. The system of claim 10, further comprising a storage module for saving or backing-up the chat session.

14. The system of claim 13, further comprising a restore module for restoring the chat session.

15. The system of claim 10, further comprising a virtual reality or augmented reality module for initiating a virtual reality or augmented reality session between the plurality of users.

16. The system of claim 10, further comprising a marketing module for receiving one or more marketing or promotional information and delivery criteria to the first, second, or third users.

17. The system of claim 11, wherein the delivery criteria of the marketing module is comprised of transmitting the marketing or advertising information depending on the geographical location of the first, second, or third users-.

18. The system of claim 10, further comprising a points of interest module for displaying one or more points of interest on the geographical map and a plurality of information associated with the one or more points of interest.

19. A method of managing an instant messaging social network on a mobile device, the method comprised of:

receiving a request from a first user to unlock access to a portal; displaying a contact list at the portal, wherein the contact list is comprised of at least a second user and a third user;

displaying one or more geographic locations of the second user and the third user on a geographical map;

receiving a request from the first user to initiate a chat session with the second user or the third user from either the contact list or the geographical map;

receiving a request from the first user to define one or more privacy settings, wherein the privacy settings are comprised of:

defining a first image and a second image to be displayed as one or more profile images to the second user and the third user, wherein the first image is viewable to the second user and the second image is viewable to the third user as a profile image of the first user, wherein the third user is unable to view the first image as the profile image and the second user is unable to view the second image as the profile image; and defining a first geographical location and a second geographical location to be displayed as a current location of the first user having the first image as the profile image to the second user and the second image as the profile image to the third user, wherein the first location is viewable to the second user and the second location is viewable to the third user.

\* \* \* \* \*